(12) United States Patent
Jacobson et al.

(10) Patent No.: US 7,882,339 B2
(45) Date of Patent: Feb. 1, 2011

(54) PRIMITIVES TO ENHANCE THREAD-LEVEL SPECULATION

(75) Inventors: Quinn A. Jacobson, Sunnyvale, CA (US); Hong Wang, Fremont, CA (US); John Shen, San Jose, CA (US); Gautham N. Chinya, Hillsboro, OR (US); Per Hammarlund, Hillsboro, OR (US); Xiang Zou, Beaverton, OR (US); Bryant Bigbee, Scottsdale, AZ (US); Shivnandan D. Kaushik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 11/165,639

(22) Filed: Jun. 23, 2005

(65) Prior Publication Data

US 2006/0294326 A1    Dec. 28, 2006

(51) Int. Cl.
  G06F 7/38     (2006.01)
  G06F 9/00     (2006.01)
  G06F 9/44     (2006.01)
  G06F 15/00    (2006.01)
(52) U.S. Cl. .................................................. 712/244
(58) Field of Classification Search ................ 712/228, 712/244
  See application file for complete search history.

(56) References Cited

U.S. PATENT DOCUMENTS

| | | | |
|---|---|---|---|
| 4,819,234 A * | 4/1989 | Huber | 717/129 |
| 5,428,761 A * | 6/1995 | Herlihy et al. | 711/130 |
| 5,966,530 A | 10/1999 | Shen et al. | |
| 6,799,236 B1 * | 9/2004 | Dice et al. | 710/200 |
| 6,862,664 B2 | 3/2005 | Tremblay | |
| 2004/0154012 A1 | 8/2004 | Wang | |
| 2004/0162948 A1 | 8/2004 | Tremblay et al. | |
| 2004/0162967 A1 * | 8/2004 | Tremblay et al. | 712/228 |
| 2004/0162968 A1 | 8/2004 | Tremblay | |
| 2004/0163082 A1 | 8/2004 | Tremblay | |

OTHER PUBLICATIONS

Rajwar et al—2001—Speculative Lock Elision: Enabling Highly Concurrent Multithreaded Execution.
Sohi et al—1995—Multiscalar Processors.
Hammond et al—2004—Programming With Transactional Coherence and Consistency (TCC).
PCT/US2006/024727 International Search Report and Written Opinion dated Dec. 4, 2007.
Gniady C et al., "IS SC+ILP=RC?" Computer Architecture News, ACM, vol. 27, No. 2, May 1999, pp. 162-171.

* cited by examiner

*Primary Examiner*—Eddie P Chan
*Assistant Examiner*—Corey Faherty
(74) *Attorney, Agent, or Firm*—David P. McAbee

(57) ABSTRACT

A processor may include an address monitor table and an atomic update table to support speculative threading. The processor may also include one or more registers to maintain state associated with execution of speculative threads. The processor may support one or more of the following primitives: an instruction to write to a register of the state, an instruction to trigger the committing of buffered memory updates, an instruction to read the a status register of the state, and/or an instruction to clear one of the state bits associated with trap/exception/interrupt handling. Other embodiments are also described and claimed.

11 Claims, 8 Drawing Sheets

PRIMITIVES TO ENHANCE THREAD-LEVEL SPECULATION

BACKGROUND

1. Technical Field

The present disclosure relates generally to information processing systems and, more specifically, to support for thread-level speculation.

2. Background Art

Increasingly, multithreading is supported in hardware. For instance, in one approach, processors in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors to operating systems and user programs. For SMT, multiple software threads can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT and/or CMP systems, an application may be parallelized into multi-threaded code to exploit the system's concurrent-execution potential. The threads of a multi-threaded application may need to communicate and synchronize, and this is often done through shared memory. Otherwise single-threaded program may also be parallelized into multi-threaded code by organizing the program into multiple threads and then concurrently running the threads, each thread on a separate thread unit. When certain assumptions regarding dependencies are made during the parallelization process for an otherwise single-threaded program, the technique is sometimes referred to as speculative multithreading.

To increase the performance of, and/or to make it easier to write, multi-threaded programs thread-level speculation can be used. Thread-level speculation refers to a thread's performance of a block of instructions speculatively. That is, the thread executes the instructions but other threads are not allowed to see the result of the instructions until the thread makes a decision to commit or discard (also known as abort) the work done speculatively.

Processors can make thread-level speculation more efficient by providing the ability to buffer and contain memory updates done as part of a speculative block of instructions. The memory updates may be buffered until directed to perform or discard the speculative memory updates.

One of the things that a program may want to speculate on is whether a block of code is dependent on other code running concurrently on other threads. Processors can make this more efficient by providing support for detecting dependencies. For example, a processor may provide support to detect whether a speculative block of code reads any memory locations that is subsequently modified by another concurrent thread.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of a systems, methods and mechanisms to provide speculative multithreading with transactional execution support.

DETAILED DESCRIPTION

The following discussion describes selected embodiments of methods, systems and mechanisms to provide hardware support for thread-level speculation. The apparatus, system and method embodiments described herein may be utilized with single-core or multi-core multithreading systems. In the following description, numerous specific details such as processor types, multithreading environments, system configurations, data structures, and instruction mnemonics and semantics have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

For multi-threaded workloads that exploit thread-level speculation, at least some, if not all, of the concurrently executing threads may share the same memory space. As used herein, the term "cooperative threads" describes a group of threads that share the same memory space. Because the cooperative threads share memory space, they may read and/or write to the same memory items. Accordingly, concurrently-executed cooperative threads should be synchronized with each other in order to do correct, meaningful work.

Figure 1:
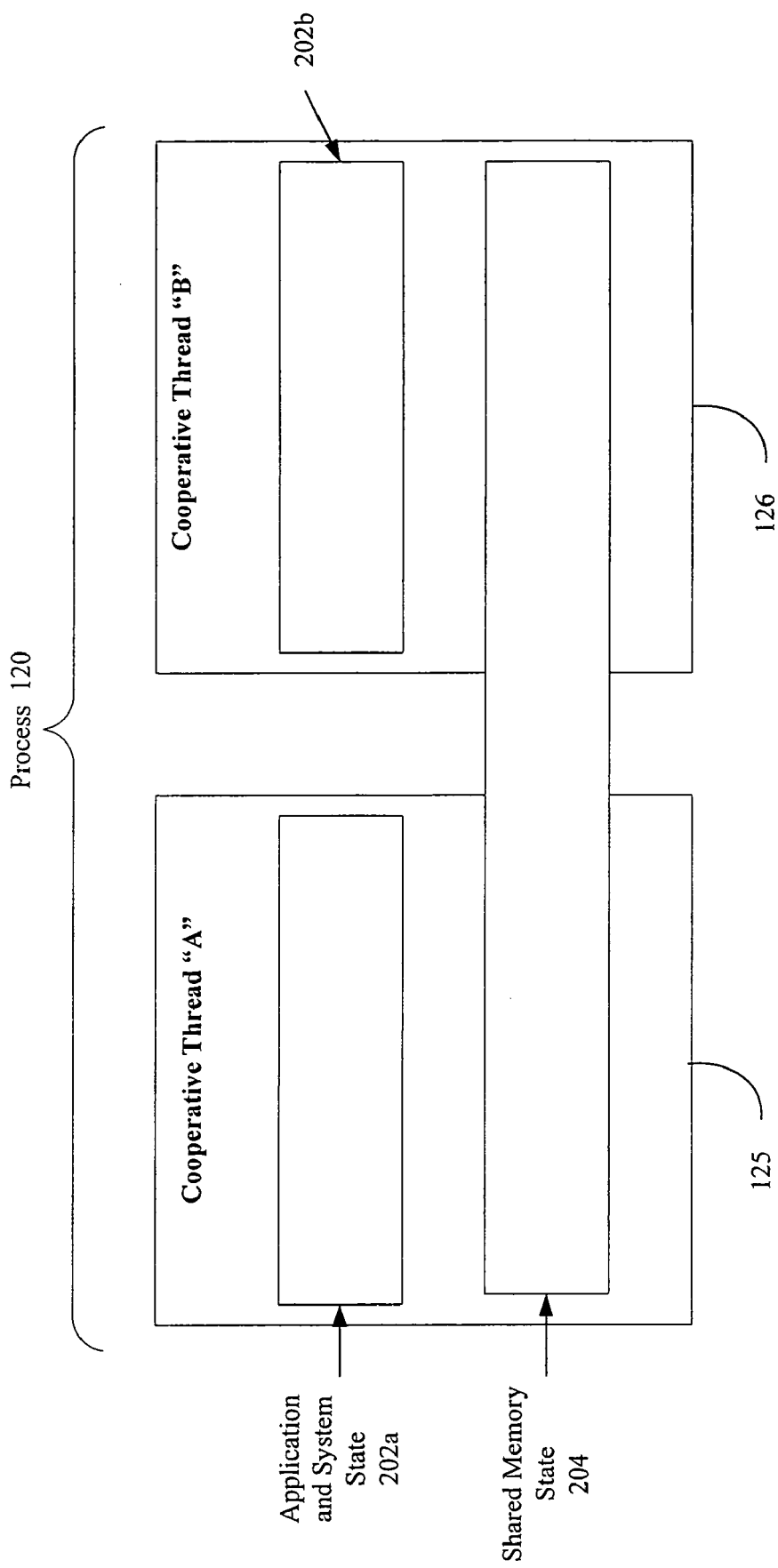
FIG. 1 is a block diagram presenting a graphic representation of a general parallel programming approach.

FIG. 1 is a block diagram illustrating, in graphical form, two cooperative threads 125, 126 that share a common logical view of memory. Such a shared-memory multiprocessing paradigm may be used in an approach referred to as parallel programming. According to this approach, an application programmer may split a software program, sometimes referred to as an "application" or "process," into multiple threads to be run concurrently in order to express parallelism for the software program. That is, an otherwise single-threaded program, or "process" 120, may be broken up into two threads 126, 125 that may execute concurrently.

FIG. 1 illustrates that each thread 125, 126 has its own application and system state 202a, 202b, respectively. A particular logical view 204 of memory is shared by the cooperative threads 125, 126 associated with a particular process 120. Accordingly, for at least one embodiment, the cooperative threads 125, 126 may each share the same view of virtual memory that is constructed by the operating system for the process 120 and may have visibility to each others' virtual address space.

FIG. 1 illustrates, for simplicity of discussion, only two threads 125, 126 for a process 120. However, such example illustration should not be taken to be limiting. The number of cooperative threads associated with a process 120 may be more than two. The upper bound on the number of threads associated with a process 120 may be limited by an OS program (not shown).

Various approaches have been devised to deal with synchronization of memory accesses for cooperative threads. A common approach for dealing with the synchronization of cooperative threads is the use of memory locks. Memory locks may be used to guarantee that a particular thread has exclusive access to shared data for a particular section of code. In traditional multi-threaded algorithms, locks may be used around any critical section of code that may ever cause incorrect behavior if multiple threads execute critical sections concurrently. For such approach, a thread may acquire the lock, execute its critical section, and then release the lock. Performance can be degraded by locks because they can inhibit multiple threads from running concurrently. Performance can be further degraded if, "just to be safe", locks are held more than necessary. That is, locks may often be used rather pessimistically.

To minimize the performance impact of locks, multiple different locks can be used by an application so that locking is done at a fine level of granularity associated with either different sections of code or with different blocks of code. Fine-grain locking may be cumbersome to implement in code, and may be prone to deadlock when a single thread must acquire ownership of multiple locks.

For a variety of reasons, concurrent accesses to a set of shared data structures by multiple threads within critical sections may, in fact, not conflict for any specific occurrence. For such cases, the serialization provided by locks is not necessary in order to ensure correct execution. Pessimistic use of locks in such cases may prohibit full realization of the benefits of parallelism because one thread will wait for a free lock, and then acquire the lock in a serialized manner, even if such serialization is not required to maintain accurate memory values.

Accordingly, one approach to avoiding unnecessary serialization is known as Speculative Lock Elision ("SPE"). The SPE approach may reduce the cost of locks. Such approach is described in "Speculative Lock Elision: Enabling Highly Concurrent Multithreaded Execution," Rajwar et al., Proc. 30$^{th}$ ACM/IEEE Int'l. Symp. on Microarchitecture, 2001. For such approach, it is recognized that some synchronization instructions have been used pessimistically and are not necessary. For SPE, some synchronization instructions are predicted as unnecessary and are elided. In cases where two concurrently-executing critical sections do not touch any of the same memory locations, then the artificial serialization of locks is avoided.

As an alternative approach to the locking and SPE schemes discussed above, transactional execution has emerged. Under a transactional execution approach, a block of instructions may be demarcated as an atomic block and may be executed atomically without the need for a lock. (As used herein, the terms "atomic block" and "transactional block" may be used interchangeably.) Semantics may be provided such that either the net effects of the each of demarcated instructions are all seen and committed to the processor state, or else none of the effects of any of the demarcated instructions are seen or committed. This provides an alternative form of synchronization for accessing shared memory, with a number of benefits in terms of concurrency and also in the reasoning that needs to be done by the program writer.

Speculative Lock Elision and Transaction Execution can both be achieved with thread-level speculation support. In both cases, the semantics require a block of code to be executed speculatively while monitoring for data dependencies. The required support includes some way to buffer memory updates performed within the speculative region and then commit or discard the updates. The required support also includes some way to detect if a memory read within the speculative region observed a value that was modified by another thread during the period of speculation. This requires some way to remember all the memory addresses read within a speculative region and monitor them for updates by other threads.

Speculative Multi-threading is another approach to multi-threading a program and using thread-level speculation. For Speculative multi-threading a sequential program is partitioned into sequential tasks, or blocks of code, that are then run in parallel. The tasks are ensured to commit their updates in order to preserve the original sequential semantics. The tasks also monitor if any updates by previous tasks change the values they observed, in which case they need to discard their speculative updates and redo the work. The hardware support for this is fundamentally the same thread-level speculation support discussed above.

There have been many different proposals on how to build the hardware support for thread-level speculation, as well as how to provide the software interface. Most of these approaches have provided the same basic functionality through varying interfaces. Effectively they checkpoint some of the architected state. Then they continue execution, buffering memory updates and monitoring memory locations that are read for foreign writes.

During execution of an atomic block of a cooperative thread, for at least one known transactional execution approach, the memory state created by the thread is speculative because it is not known whether the atomic block of instructions will successfully complete execution. That is, a second cooperative thread might contend for the same data, and then it is known that the first cooperative thread cannot be performed atomically. That is, it is known that there has been a misspeculation regarding the first and/or second cooperative thread. To provide for misspeculation, the processor state is not updated during execution of the instructions of the atomic block, according to at least some proposed transactional execution approaches. Instead, processor state is maintained as an undefined intermediate state until the atomic block completes execution.

For such approaches, the state of the processor at each instruction of the atomic block depends on whether or not the state of the atomic block will ultimately be committed. Thus, during execution of the atomic block the intermediate state is 1) a first state if the state is ultimately be committed (analogous to the state that would be maintained in a speculative memory buffer, discussed above) and 2) a second state if the state is not ultimately committed.

Accordingly, for some common transactional execution approaches, the intermediate state for an atomic block is not defined. This makes certain operations, such as precise trap-handling and single-step debugging, infeasible for instructions inside an atomic block. However, FIG. 2 illustrates at least one embodiment of a thread execution unit that supports speculative threading and transactional execution, and that also provides a precise architected state at the boundary (such as retirement) of every instruction in an atomic block.

Figure 2:
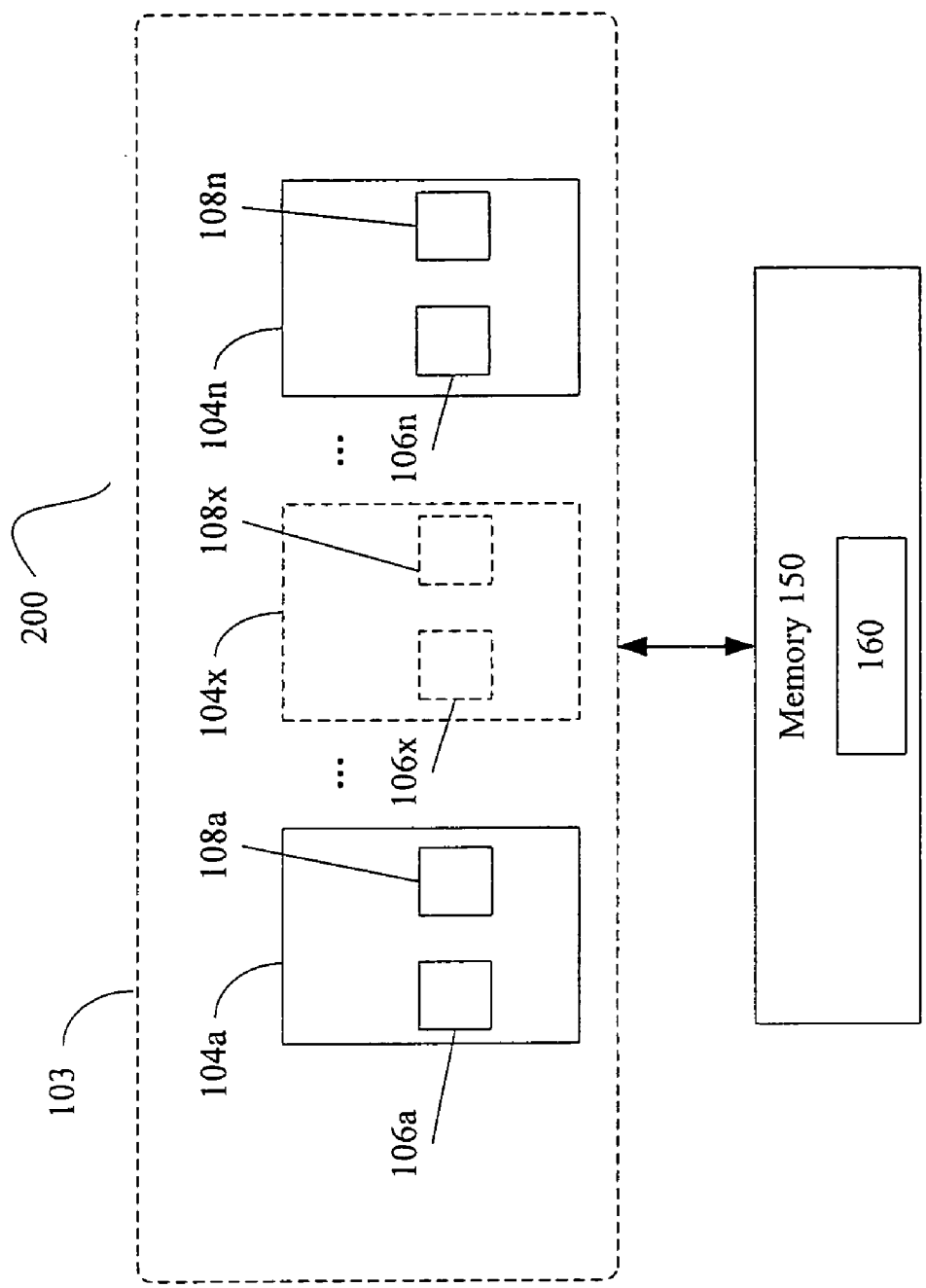
FIG. 2 is a block diagram illustrating selected features of a processor according to at least one embodiment of the present invention.

FIG. 2 is a block diagram illustrating a multi-threaded processor 200 that provides the ability to implement transactional execution while providing precise architected state at the boundary of every instruction, including instructions within a transactional block. The processor 200 supports concurrent execution of more than one thread at a time. As used herein, the term "thread" includes, at least, the concept of independent execution of a stream of instructions that may be executed concurrently with other threads of a process. The "thread" term encompasses the idea, therefore, of execution of a software instruction stream along with the associated processor state.

For at least on embodiment, the processor 200 may execute a portion of an application's code that has been parallelized through the use of cooperative threads. For example, a speculative thread, referred to as the spawnee thread, may run on the processor 200 to execute instructions that are ahead, in program order, of the code being executed, on the processor 200, by the thread that performed the spawn. The thread that performed the spawn is referred to as the spawner thread.

FIG. 2 illustrates at least one CMP embodiment, where each of multiple thread units 104 is a processor core, with the multiple cores 104a-104n residing in a single chip package 103. Each core 104 may be either a single-threaded or multi-threaded processor. For at least one embodiment, a CMP core (such as, e.g., 104a) separate from the core executing the spawner thread (such as, e.g., 104c) executes the spawnee thread.

For at least one alternative embodiment, the processor 200 may be a single-core processor that supports concurrent multithreading. For such embodiment, each thread unit 104 is a logical processor having its own next-instruction pointer and fetch logic, although the same processor core executes all thread instructions. (The terms "thread unit" and "sequencer" may be used interchangeably herein). For such embodiment, the logical processor 104 maintains its own version of the architecture state, although execution resources of the single processor core are shared among all threads.

For such alternative embodiment, the spawnee thread is executed in a single-core simultaneous multithreading system that supports speculative multithreading. For such embodiment, the spawnee thread is executed by a second SMT logical processor (such as, e.g., 104a) on the same physical processor 200 as the spawner thread, while the spawner thread is executed by another SMT logical processor (such as, e.g., 104n). One skilled in the art will recognize that the transactional execution embodiments discussed herein may be utilized in any multithreading approach, including SMT, CMP multithreading or other multiprocessor multithreading, or any other known multithreading approach.

While the CMP embodiments of processor 200 discussed herein refer to only a single thread per processor core 104, it should not be assumed that the disclosures herein are limited to single-threaded processors. The techniques discussed herein may be employed in any CMP system, including those that include multiple multi-threaded processor cores in a single chip package 103.

Accordingly, FIG. 2 illustrates that the processor 200 includes two or more thread units 104a-104n. For purposes of discussion, the number of thread units is referred to as "N." The optional nature of thread units 104 in excess of two such thread units is denoted by dotted lines and ellipses in FIG. 2. That is, FIG. 2 illustrates N≧2. For simplicity of discussion, a CMP embodiment is discussed in further detail herein. That is, each thread unit 104 may be representative of 32-bit and/or 64-bit processors such as Pentium®, Pentium® Pro, Pentium® II, Pentium® III, Pentium® 4, and Itanium® and Itanium® 2 microprocessors. Such partial listing should not, however, be taken to be limiting.

The embodiment of a processor 200 illustrated in FIG. 2 is designed to provide certain semantics in support of speculative multithreading. (Each is discussed in further detail below). While certain specific implementations of such features are discussed below, it should be understood that such implementation details are provided for purposes of example only and should not be taken to be limiting.

First, the processor 200 provides some way to demarcate the beginning and end of a set of instructions (referred to interchangeably herein as an "atomic block" or "transactional block") that includes a memory operation for shared data.

Second, the processor 200 includes hardware that monitors load (memory read) addresses in order to detect contention among cooperative threads.

Third, the processor 200 includes hardware (a "store buffer") to buffer store (memory write) operations.

Fourth, the processor 200 is designed to perform atomic updates of memory from the store buffer (if no contention is perceived during execution of the atomic block).

Finally, the processor 200 is designed to discard the memory updates of the store buffer and to signal a failure if contention is detected during execution of the atomic block. Such general capabilities are provided by at least one embodiment of the processor 200.

Regarding the demarcation of an atomic block, the processor 200 may provide such support in any of several manners. For at least one embodiment, a programmer may indicate that a read or write instruction is part of an atomic block by setting particular bits in the instruction opcode itself For example, an "atomic" indicator may be part of the instruction opcode, or may be indicated by a particular prefix for the load or store instructions.

For at least one other embodiment, an instruction set supported by the processor 200 may include explicit architectural demarcation instructions. That is, the instruction set for the processor 200 may include a "begin monitor" instruction that may be placed by the programmer at the beginning of the atomic block. Similarly, the instruction set for the processor 200 may also include a "stop monitor" instruction that may be placed by the programmer after the last instruction of the atomic block. For at least one embodiment, a single instruction may be used to manipulate a control register to perform both the "begin monitor" and "stop monitor" instructions. Further discussion for at least one embodiment of such instruction and control register are set forth below in connection with FIG. 7.

As is stated above, an embodiment of a processor 200 that supports speculative multithreading and transactional execution may provide hardware-based monitoring of load (memory read) addresses in order to detect contention among cooperative threads. FIG. 2 illustrates that each thread unit 104 may include a table 106 to store one or more addresses to be monitored for external updates. Such table 106 may be referred to as an address monitor table ("AMT"). The logical concept of the AMT 106 may be architecturally defined for the thread unit 104 but does necessarily need to be implemented as a discrete hardware table structure.

The AMT 106 may be useful because, as is stated above, the potential dependencies and/or shared data contention within an atomic block may be ambiguous. If the programmer had known that another thread would try to write to an address used in the atomic block, during execution of the atomic block, the programmer would presumably not have tried to read the location during concurrent execution. In other words, if the programmer had known that the contention/dependency existed in the original program, an attempt to parallelize the code in this manner would not have been made; the code would have been permitted to execute the contentious instructions sequentially, as originally written. The AMT 106 thus may be useful in identifying misspeculations.

In addition, FIG. 2 illustrates that each thread unit 104 may also include a table 108 to buffer memory updates that may be performed later, if it is determined that the thread performing the updates was not misspeculated. Such table 108 may be referred to as an atomic update table ("AUT"). (For an SMT embodiment, a single AMT 106 and AUT 108 may be shared among logical processors, with different portions of the tables being allocated to each logical processor). The AUT 108 may buffer memory writes performed during an atomic block. Such approach avoids making other threads utilize the intermediate state of the atomic block.

When it is finally determined whether or not the atomic block has been able to complete execution without unresolved dependencies or contention with another thread, then the memory updates buffered in the AUT 108 may be performed atomically. If, however, the transaction fails (that is, if the atomic block is unable to complete execution due to contention or unresolved data dependence), then the AUT 108 may be cleared and the buffered updates are not performed. In this manner, already-performed memory writes need not be unrolled responsive to a determination that a misspeculation has occurred.

At least one embodiment of the processor 200 illustrated in FIG. 2 provides a precise architected state at the boundary (such as retirement) of every instruction in an atomic block in the following manner. Certain user-controllable state in the processor 200 may be set to indicate that a transaction failure should not occur if a trap or exception occurs during execution of the instructions of an atomic block. Instead, the contents of the AMT 106 and AUT 108 are preserved while the exception/trap is handled. After such handling, execution of the atomic block may continue. In this manner, a precise state is maintained so that execution of the atomic block may be resumed after the trap or exception is handled Although the AMT 106 and AUT 108 are illustrated as discrete blocks in FIG. 2, such illustration is meant to convey that such tables are logically distinct structures. Although such tables 106, 108 may be architecturally explicit, their specific organization and physical structure is a matter of design choice and the exact manner of physical implementation should not be taken to be limited to any particular structure or organization. Generally, the information of the AMT 106 and AUT 108 may be maintained in any storage area. For example, the logical "tables" 106, 108 may be a collection of bits or may be extensions to other existing hardware structures.

Regarding of the specific manner of implementing the AMT 106 and AUT 108, the tables 106, 108 may be generally implemented in one or more physical storage area(s) as a finite logical construct. The finite nature of the tables 106, 108 necessarily restricts the number of instructions that can be successfully executed as a transaction. Accordingly, one or more memory tables in a backstore 160 may be used to extend the size of the AMT 106 and/or AUT 108.

FIG. 2 illustrates that at least one embodiment of the processor 200 may be coupled to a memory 150, where a portion of the memory 150 may be utilized by software to maintain a backstore 160 for the AMT 106 and/or the AUT 108. Software may control spilling of overflow entries from the tables 106, 108 to the backstore 160.

For at least one embodiment, the AMT 106 may be implemented as a structure that is parallel to a load buffer. Similarly, the AUT 108 may be implemented as a structure that is parallel to a store buffer. One possible configuration for such embodiment is illustrated in FIG. 8.

Figure 8:
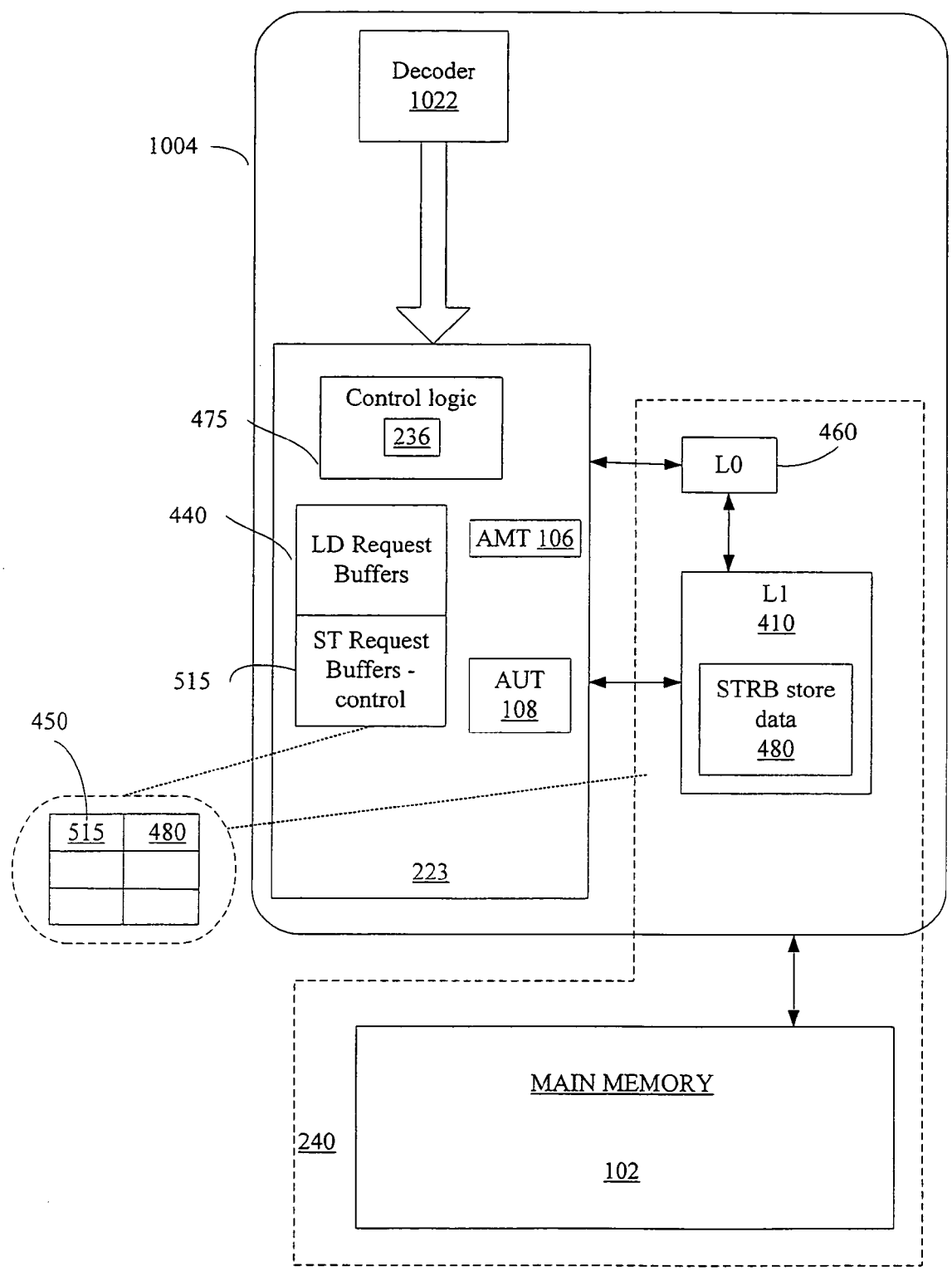
FIG. 8 is a block diagram illustrating at least one embodiment of processor that includes an address monitor table and an atomic update table to support transactional execution.

FIG. 8 is a block diagram illustrating in further detail at least one embodiment of a processor 1004 that includes an AMT 106 and AUT 108 as well as including load request buffers 440 and store request buffers 450. One or more of the AMT 106, AUT 108, store request buffers 440 and/or load request buffers 450 may be part of a memory ordering buffer (MOB) 223. The processor 1004 may also include a decoder 1022, to receive and decode instructions of an instruction set. The decoder 1022 may be capable of receiving and decoding instructions; the instructions to be decoded by the decoder 1022 may include one or more instructions to perform the operations described below in connection with Table 1.

FIG. 8 illustrates a processor 1004 that implements a non-blocking cache memory subsystem (the cache memory subsystem will sometimes be referred to herein by the shorthand terminology "cache system"). The cache system includes an L0 cache 460 and an L1 cache 410. For at least one embodiment, the L0 cache 460 and L1 cache 410 are on-die caches. The processor 1004 may also retrieve data from a main memory 102. The main memory 102, L1 cache 410, and L0 cache 460 together form a memory hierarchy 240.

The memory order buffer ("MOB") 223 may temporarily hold the state of outstanding load and store instructions from dispatch to completion. For at least one embodiment, this state information for store instructions may be maintained in store request buffers 450 and this state information for load instructions may be maintained in load request buffers 440.

For at least one embodiment, tracking of load instructions may optionally be handled via the AMT 106, which may be utilized along with load request buffers 440 during transactional execution.

For at least one embodiment, the state information for outstanding store instructions may be maintained in store request buffers 450 for normal operation or, instead, may be maintained in the AUT 108 during transactional execution.

FIG. 8 illustrates that each store buffer entry 450a-450n may include a control portion 515. Although logically associated with each other as illustrated in FIG. 8, one skilled in the art will recognize that the control portion 515 and the data portion 480 of a store request buffer entry 450a-450n need not necessarily physically reside in contiguous storage areas of a storage device, nor even reside in the same storage device. For instance, FIG. 8 illustrates that the control portion 515 of the store buffers 450 may be included in the MOB 223 while the data portion 480 may reside in an on-die cache 410.

For at least one embodiment, the MOB 223 includes control logic 475. Control logic 475 includes selection logic 236 to determine whether store data should be buffered in store request buffers 450 or in the AUT 108. For at least one embodiment, the selection logic 236 may direct that a store should be recorded in only one of the store request buffers 450 or the AUT 108. That is, determination of where to hold store data may be an "exclusive-OR" operation. The selection logic 236 may indicate that, when atomic execution is not being performed, store state may be buffered in the store request buffers 450. However, during atomic execution, the selection logic 236 may instead cause the store state to be buffered in the AUT 108.

For at least one embodiment, the selection logic 236 is also to determine whether the memory address for load data, which has been read from memory, should be entered into the AMT 106. Such entry may be made, during atomic execution, along with the normal operation of pulling memory read data into the load request buffers 440. That is, determination of whether to monitor load addresses in the AMT 106 may be a selective operation, such that monitoring is performed in addition to normal load request buffer 440 operation.

The use of the AMT 106 and AUT 108 allows speculative multithreading of code that would otherwise be hard to parallelize because of ambiguous data dependencies or data contention. Through the use of the logical address monitor table 106 and the logical address update table 108, the processor 200 may detect that certain potential data dependencies or contention, which appear ambiguous before execution, may indeed exist between threads during execution. As is explained above, the tables 106, 108 thus support monitoring of load (memory read) operations and buffering of store (memory write) operations, respectively.

Figure 3:
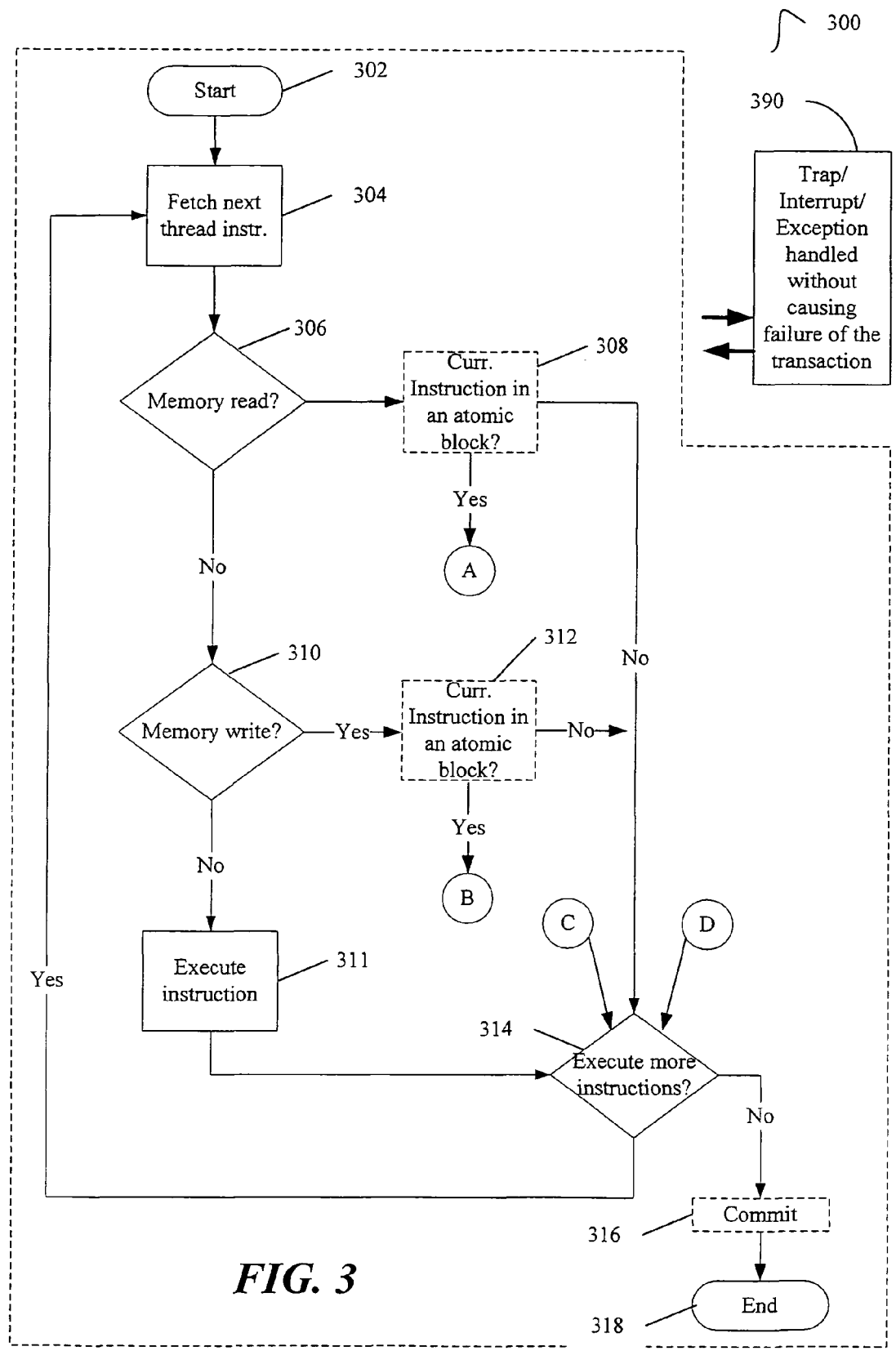
FIGS. 3, 4 and 5 are flowcharts illustrating data and control flow for at least one embodiment of a method for performing speculative multithreading with transactional execution support.

FIG. 3 is a flow diagram illustrating data and control flow for at least one embodiment of a method 300 for performing speculative multithreading with transactional execution support using the AMT 106 and AUT 108. Generally, the method 300 executes instructions of an atomic block but buffers updates to memory. Also, the method 300 generally provides for monitoring memory addresses that are read during execution of the atomic block, in order to determine if another thread attempts to perform a write to the same address. If so, there is contention for that memory address during the execution of the atomic block, and transactional execution of the block fails due to the contention for the memory address.

FIG. 3 illustrates that the method 300 begins at block 302. It is assumed that the method 300 is performed on a block that has been demarcated as a transactional block. As is mentioned above, it is therefore assumed for at least one embodiment that a "begin monitor" instruction has been executed prior to beginning the method 300. For such embodiment, it is also assumed that execution of a "stop monitor" instruction will cause the determination at block 314 to evaluate to a false value.

Alternatively, the demarcation may be denoted by marking each load and store instruction within the atomic block with a prefix, opcode field, or other individualized indicator that the instruction is to be performed as part of an atomic block. For such embodiment, the optional blocks 308 and 312 (denoted as optional by the use of broken lines), are performed to determine whether the instruction is part of an atomic block.

It is assumed that, for at least one embodiment, the method 300 is performed by a thread execution unit (see, e.g., 104 of FIG. 2) of a processor that includes an AMT 106 and an AUT 108 (see FIG. 2). Accordingly, it will be understood by one of skill in the art that the determination of whether an instruction is part of an atomic block is also an indication that any memory writes performed during normal execution of the demarcated instructions should be buffered in the 108 and that the address for any memory reads performed during normal execution of the demarcated instructions should be maintained in the AMT 106.

FIG. 3 illustrates that, at any time during execution of the atomic block according to the method 300 shown, a trap, exception or interrupt may be taken. If such event is taken, precise architected state may be maintained. In other words, the contents of the AMT 106 and AUT may be maintained during the handling of the exception/interrupt/trap event. Such event is not treated as a condition that causes a failure. Instead, execution of the atomic block according to the method 300 illustrated in FIG. 3 may be resumed when after handling of the event. FIG. 3 illustrates at block 390 that such an event is not a failure condition for at least one embodiment of the method 300.

FIG. 3 illustrates that processing for the method 300 proceeds from block 302 to block 304. At block 304, the next instruction of a thread is fetched and decoded. Processing then proceeds to block 306. At block 306, it is determined whether the instruction fetched and decoded at bock 304 is a memory read instruction (such as, for example, a load instruction). If so, then processing proceeds to optional block 308. Otherwise, processing proceeds to block 310.

Optional block 308 determines whether the instruction is part of an atomic block. The maimer of such determination may differ across various implementations. For an implementation that does not embed such information in the memory write instruction itself, but instead uses a "begin monitor" instruction, such determination 308 need not be performed for each memory read instruction. Instead, it is assumed that a "being monitor" instruction has been executed prior to beginning execution of the method 300 at block 302 and that the method 300 is aware of this during execution. For at least one embodiment, for example, such information may be maintained in a control register, such as the transaction control register ("TCR") discussed below. For such embodiments, processing proceeds from block 306 to connector "A", and does not perform optional block 308. The processing associated with connector "A" is described in further detail in connection with FIG. 4.

At block 310, it is determined whether the instruction fetched and decoded at bock 304 is a memory write instruction (such as, for example, a store instruction). If so, then processing proceeds to optional block 312. Otherwise, processing proceeds to block 311.

Optional block 312 determines whether a memory write instruction is part of an atomic block. Again, the manner of such determination may differ across various implementation embodiments. For an implementation that does not embed such information in the memory write instruction itself, but instead uses a "begin monitor" instruction, such determination 312 need not be performed for each memory write instruction. Instead, as is explained above, it is assumed that a "being monitor" instruction has been executed prior to beginning execution of the method 300. Again, such information may be stored in a control register. For such embodiments, processing proceeds from block 310 to connector "B", and does not perform optional block 312. The processing associated with connector "B" is described in further detail in connection with FIG. 5.

If the current instruction that has been fetched at block 304 is neither a memory read instruction nor a memory write instruction, processing falls through to block 311. The instruction is executed at block 311. Processing then proceeds to block 314.

Block 314 is performed for embodiments that utilize a "begin monitor" and "stop monitor" instruction. For such embodiments, the determination at block 314 evaluates to "false" if no "stop monitor" instruction has been encountered.

Block 314 is also performed for embodiments that do not utilize a "begin monitor" demarcation instruction and that instead associate an atomic block indicator with individual memory instructions. For such embodiments, the determination at block 314 determines whether some kind of termination indicator has been reached. For at least one embodiment, the termination indicator may be an instruction, or opcode bits or prefix for an instruction, that indicate that the buffered updates in the AUT (see 108, FIG. 2) should be committed to memory. For such embodiment, the determination at block 314 evaluates to "true" if the termination indicator has not been encountered.

Processing loops back to block 304 in order to fetch the next instruction if the determination at block 314 evaluates to "true." Otherwise, processing may end at block 318 or may optionally proceed to block 316.

If the method 300 reaches block 316 without suffering a transaction failure interrupt, the atomic block has successfully completed execution without contention. Accordingly, the memory updates that have been buffered during execution of the atomic block may be committed 316 to memory. At block 316, the buffered memory updates from the AUT 108 are thus committed to memory atomically. The entries of the AUT 108 may then be cleared. The atomic update that commits the entries of the AUT 108 to memory at block 316 may be performed responsive to an instruction (placed, for example, by the programmer after the last instruction of the atomic block). An example embodiment of such instruction, a speculative execution commit instruction, is discussed in greater detail below in connection with Table 1.

For at least one embodiment, other actions may also be performed at block 316. For example, actions may be taken to disable, now that the atomic block has completed execution, updating of the AMT 106 for subsequent memory reads. Buffering of subsequent memory writes in the AUT table 108 may also be disabled at block 316. Processing for the method 300 then ends at block 318.

Figure 4:
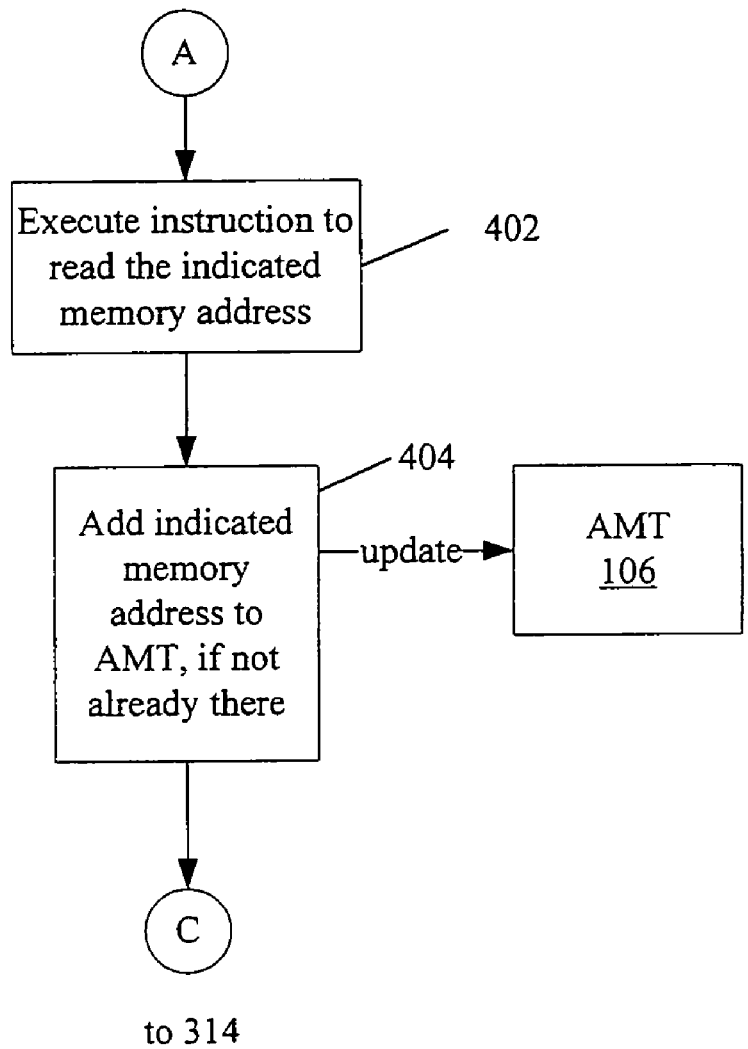

FIG. 4 is a block diagram illustrating at least one embodiment of processing "A" that is performed if the determination at block 306 (and optional block 308, when appropriate) of FIG. 3 indicates that the current instruction is a memory read instruction of an atomic block. For such case, processing proceeds to block 402. At block 402, the instruction is executed in order to read the indicated memory address. Processing then proceeds to block 404.

At block 404, the indicated memory address is added to the address monitor table ("AMT") 106. Again, it should be noted that the AMT 106 is a logical construct. For example, at block 404, instead of actually modifying an entry of an AMT table to include the designated memory address, the processing of block 404 may be handled differently for different embodiments. As just one example, a status bit associated with an on-chip data cache may be toggled to indicate that a memory address in the cache line is to be monitored for foreign writes. After the AMT 106 is updated at block 404, processing returns to block 314 of FIG. 3.

Figure 5:
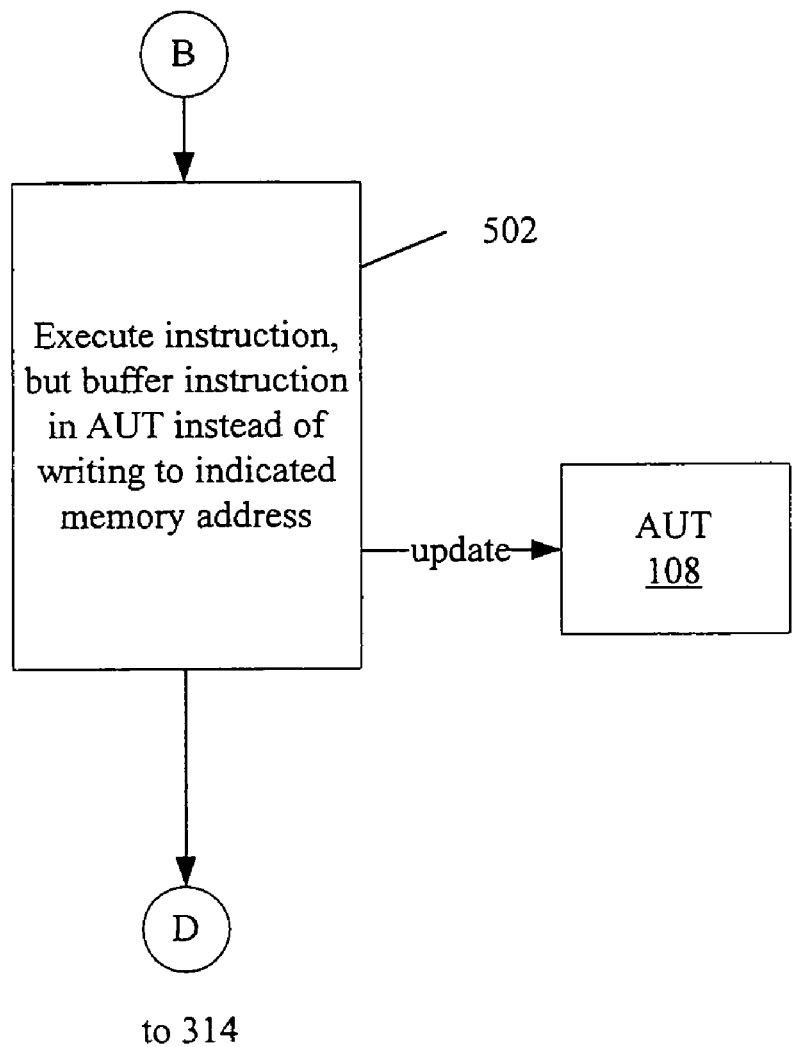

FIG. 5 is a block diagram illustrating at least one embodiment of processing "B" that is performed if the determination at block 310 (and optional block 312, when appropriate) of FIG. 3 indicates that the current instruction is a memory write instruction of an atomic block. For such case, processing proceeds to block 502. At block 502, the memory write instruction is executed. However, the memory write instruction updates an entry of the AUT 108 rather than updating memory. In this manner, memory writes performed during an atomic block are buffered in the AUT 108.

Again, the AUT 108 is a logical construct and may be implemented in hardware in various manners. For at least one example embodiment, for instance, the AUT 108 may be implemented as a gated store queue. After the AUT 108 is updated at block 502, processing then proceeds to block 314 of FIG. 3.

The discussion above illustrates that the use of the AMT 106 and AUT 108, along with some form of demarcation for atomic blocks, supports hardware thread speculation. In addition, certain instructions and state may also be integrated into such a scheme. Together, such elements may allow efficient execution of speculative threads to enable a broad range of speculative threading models.

Figure 7:
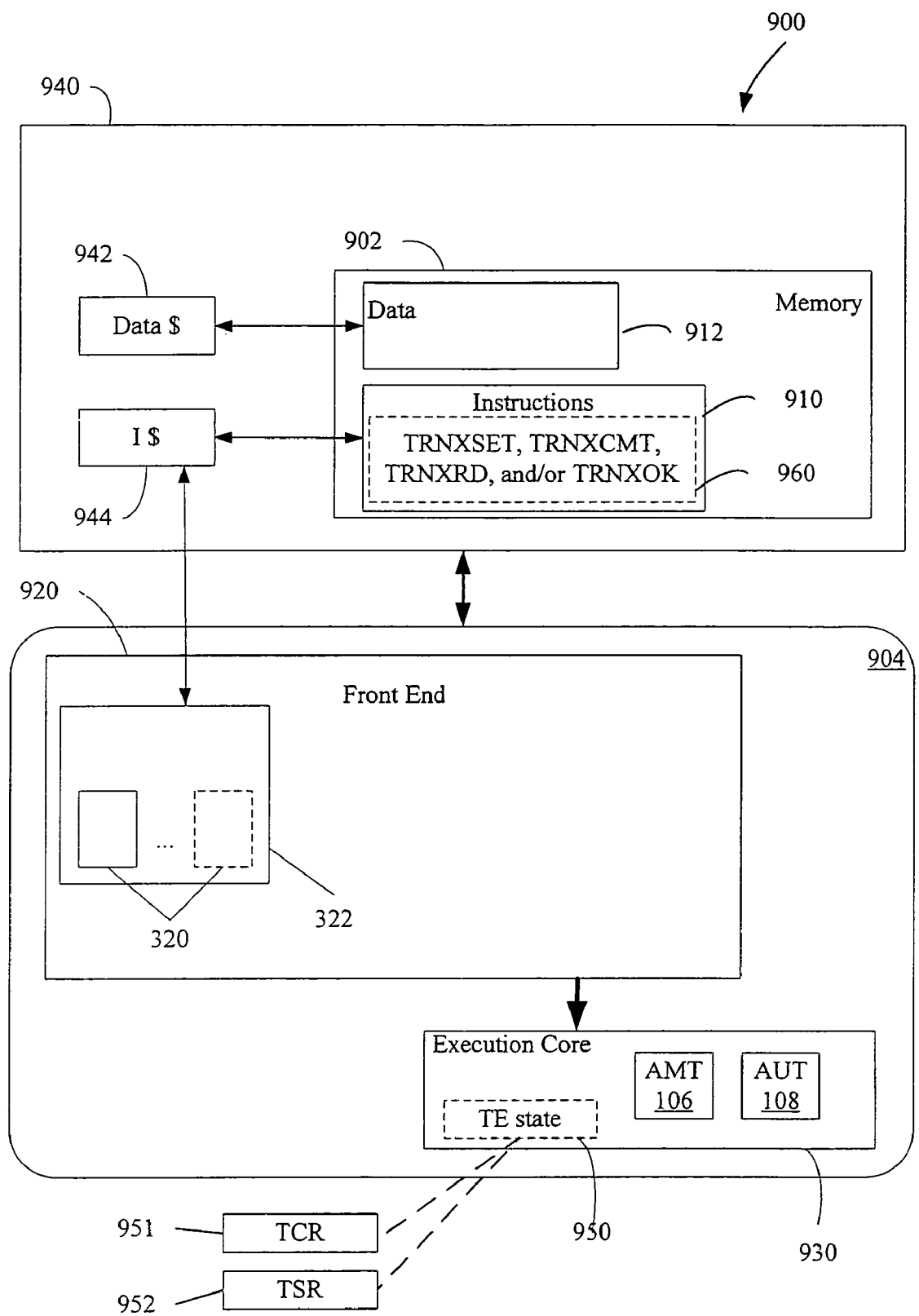
FIG. 7 is a block diagram illustrating at least one embodiment of a system capable of performing disclosed techniques.

FIG. 7 is a block diagram illustrating at least one embodiment of a thread unit 904 that includes the logical AMT 106 and AUT 108 tables, as well as certain transactional execution state 950. In addition, the thread unit 904 may be capable of executing certain instructions such that transactional execution of an atomic block may be supported in a manner that provides precise state at the boundary of each instruction of the atomic block.

The transaction state 950 illustrated in FIG. 7 is optional, as denoted by broken lines. That is, the state may be maintained in memory, via message-passing through a specified memory address, rather than being maintained as hardware state in the execution core 930. For at least one embodiment, however, the transaction state 950 is maintained in one or more hardware registers.

For at least one embodiment, registers to maintain the transaction state 950 include a transaction control register 951 (referred to herein as "TCR") and a transaction status register 952 (referred to herein as "TSR"). The transaction control register controls updates to the AMT 106 and AUT 108. The transaction status register may report the state of the AMT and AUT and may also indicate transaction failure.

The transaction control register 951 may include various bits that, when set, cause various types of behavior related to the AMT and AUT tables 106, 108. The transaction control register 951 may control whether memory updates are buffered and whether memory references are monitored for dependency checking. For example, the transaction control register may include one or more bits to denote each of the following behaviors:

Force reset of the AUT
Force reset of the AMT
Direct update of the AMT
Direct buffering of memory writes (updates to the AUT)$_{13}$ For at least one embodiment, multiple behaviors may be indicated by a single bit. For example, a single bit in the transaction control register 951 may denote that both the AUT and AMT should be reset.

For one specific embodiment, the transaction control register 951 ("TCR") includes fields that may, depending on the value stored in a field at any given time, determine the behavior of the AMT and AUT and/or may affect the execution of each instruction. Of course, other embodiments may utilize more or less bits. For an embodiment of the transaction control register 951, the fields may be defined as follows. Specific bit numbers are provided for illustrative purposes only and should not be taken to be limiting. For an embodiment that implements the bit fields described below in a register that is of any arbitrary length, additional fields not described below may be "reserved". Such reserved bits may be implemented as write ignore, read zero.

TCR Reset Bits. Two one-bit fields of the TCR 951 may be write-only bits that are used to reset and clear the AMT and the AUT:

AMT clear bit (TCR bit 0, write-only): controls the resetting of the AMT. If a '1' is written to this bit position the AMT is cleared so that there are no valid entries. The AMT clear bit reads as zero.

AUT clear bit (TRC bit 1, write-only): controls the resetting of the AUT. If a '1' is written to this bit position the buffered speculative memory updates are discarded. The AUT clear bit reads as zero.

TCR Update Bits. Two one-bit fields of the TCR 951 may be used to control the behavior of instruction execution with respect to updating the AMT or AUT:

AMT update bit (TRC bit 2): controls the updating of the AMT. If the AMT update bit is set (value of '1') then the AMT is updated for every memory location read by an instruction. If it is not set (value of '0') the AMT is not updated when an instruction is executed. Software can toggle the state of this bit to enable mixing monitored and unmonitored memory references. If the AMT update bit is set and the transaction has failed (see status bits) the AMT need not be updated.

AUT update bit (TRC bit 3): controls the buffering of memory updates at ring-level 3 (user mode). If the AUT update bit is set (value of '1') then memory updates done at ring-level 3 by instructions are buffered and not performed to memory until a transaction commit operation. If the bit is not set (value of '0') then memory updates by instructions are not buffered and are directly performed to memory as usual. If the AUT updates bit is set and the transaction has failed (see status bits) the memory updates done at ring-level 3 need not be buffered and can be simply discarded.

Optional TCR bits. Alternative implementations may provide for one or more of the following fields to be defined in the TCR:

AUT No bypass bit (TCR bit 6): causes memory reads by instructions to see the value of that memory location without checking the AUT for read-after-write bypassing as would normally be performed when the AUT is enabled. If the bit is not supported in an implementation then an attempt to set the bit (write the value '1') causes the mode not supported bit to be set in the Transaction Status Register; this forces the failure of the active transaction.

AUT update in handler (TCR bit 7): effects memory updates at ring-levels lower than 3. If the AUT enable bit and this bit are both set (value of '1') then memory updates at any ring-level will be buffered in the AUT. Updates to this bit at ring-level 3 are ignored (value is unchanged). This bit may be automatically cleared to zero on the transition from ring-level 3 to a lower ring-level (on a trap/exception/interrupt). If this bit is not implemented then an attempt to update it at ring-level less than 3 may cause the trap force failure bit to be set in the Transaction Status Register; this may force the failure of the active transaction.

The transaction status register 952 may include one or more bits to reflect certain status states related to execution of an atomic block. The contents of the transaction status register 952 may indicate the status of a transaction and may indicate a transaction failure. For example, the transaction status register 952 may include one or more bits to denote the following status states:

Whether a transaction failure has occurred

Reason for a transaction failure (if one has occurred). Values for this field may include overflow, collision, etc.

AMT state. Values for this field may include full, not full, empty, not empty, or the like AUT state. Values for this field may include full, not full, empty, not empty, or the like Whether a trap has been taken during execution of an atomic block Whether a trap has caused a transaction failure For one specific embodiment, the transaction status register 952 ("TSR") is a read-only register that includes fields that may, depending on the value stored in a field at any given time, may provide status information about the state of the AMT, AUT and the current transaction in general. Of course, other embodiments may utilize more or less bits. For an embodiment of the transaction status register 952, the fields may be defined as follows. Specific bit numbers are provided for illustrative purposes only and should not be taken to be limiting. For an embodiment that implements the bit fields described below in a register that is of an arbitrary size, additional fields not described below may be "reserved". Such reserved bits may be implemented as write ignore, read zero.

For at least one embodiment, the first bit of the TSR 952 indicates if the current transaction has failed. The next 4 bits are informational bits about the state of the AMT and AUT. The sixth bit indicates that a trap/exception/interrupt occurred while there was an active transaction (the AMT and/or the AUT is non-empty). The final set of bits may be used to indicate that the current transaction has failed and provide information as to why.

Each of the bits of the TSR may be set by the hardware in specific situations. Each bit can be affected by one or more events. If multiple events occur simultaneously, events that clear a bit may have precedence over events that set bits.

Transaction Fail Bit. The first bit of the Transaction Status Register is set if the current transaction has failed (any of the last eight status bits, bits 6 through 13, are set).

Transaction Fail Bit (TSR bit 0): indicates that the current transaction has failed. If this bit is set then at least one of the bits 6 through 13 are also set to indicate the cause of failure.

Information Bits. The next 4 bits of the TSR are informational bits about the status of the AMT and AUT. A transaction is considered active if either the AUT or the AMT, or both, are non-empty; this is indicated by the non-empty bits defined below. The bits are:

AMT non-empty bit (TSR bit 1): indicates that the AMT has at least one valid entry.

AMT full bit (TSR bit 2): indicates that the AMT is full or nearly full (the precise definition is implementation dependent). This bit indicates that subsequent updates to the AMT will likely cause the structure to overflow (if it has not already overflowed).

AUT non-empty bit (TSR bit 3): indicates that the AUT has at least one buffered memory update.

AUT full bit (TSR bit 4): indicates that the AUT is full or nearly full (the precise definition is implementation dependent). This bit indicates that subsequent updates to the AUT will likely cause the structure to overflow (if it has not already overflowed).

Trap Bit. The 5$^{th}$ bit of the TSR 952 may be used as a Trap bit to indicate that a trap/exception/interrupt has occurred when the AMT 106 or AUT 108 is non-empty. This bit can be cleared by a transaction clear trap bit instruction (see, e.g., the TRNXOK instruction in Table 1, below). If this bit is still set when a trap handler returns or when a subsequent trap/exception/interrupt occurs, it may result in the Trap Force Fail bit being set and the transaction failing:

Trap bit (TSR bit 5): may be automatically set by hardware on a trap/exception/interrupt if either the AMT or AUT is non-empty. The bit may not be set for user-level handlers. Transaction-aware handlers that know they are transaction-safe may clear this bit on entry to the handler with the transaction clear trap bit instruction (see, e.g., the TRNXOK instruction in Table 1, below). In this manner, a trap or exception may be handled as a non-failure condition, such that execution of an atomic block that was being performed when the trap/exception/interrupt was taken may be resumed after handling the event.

Transaction Failure Bits. The next 8 bits of the TSR 108 may used as fields to indicate that a transaction has failed. If there is a transaction active (either or both AUT 106 and AMT 108 are non-empty) and any of the following 8 bits become set, then a transaction is considered to have failed:

AMT overflow bit (TSR bit 6): indicates that the AMT has overflowed and at least one memory location read by the transaction has not been logged in the AMT for monitoring.

AMT coherency collision bit (TSR bit 7): indicates that the AMT has had a collision, or possible collision (conservative approximations are allowed), between an entry and a foreign update to memory.

AUT overflow bit (TSR bit 8): indicates that the AUT has overflowed and at least one memory update that was supposed to be buffered has been dropped.

AUT coherency collision bit (TSR bit 9): indicates that the AUT has observed a coherency event that will not allow it to complete the buffered updates.

AUT buffer bypass not allowed bit (TSR bit 10): this bit may be set by hardware if the AUT update bit is cleared while the AUT is enabled and non-empty, if the processor does not support direct memory updates bypassing buffered updates in the AUT.

AUT failed RAW bit (TSR bit 11): indicates that a load performed may have seen an inconsistent value because it failed to get a value bypassed from the AUT to provide correct read-after-write semantics or there was ambiguity with respect to updates in the AUT and the correct value of the load could not be determined. If there is ambiguity the value returned for the load will be the value from memory and not a value from the AUT.

Trap Force Failure bit (TSR bit 12): indicates that a failure has been forced by a trap/exception/interrupt while the AMT or the AUT was non-empty. This indicates that some action by the act of transitioning to a lower ring-level or by an action within a lower ring-level caused the active transaction to be failed. This bit can be set because the AUT was not empty and the processor does not support memory updates bypassing buffered updates. This bit may also be set by hardware when a trap/exception/interrupt occurs, or a return from trap/exception/interrupt occurs, and the Trap bit (TSR bit 5) is currently set.

Unsupported Mode bit (TSR bit 13): is automatically set by hardware if a write to the Transaction Control Register attempts to put the processor in a mode that is not supported.

All TSR 952 status bits associated with the AMT 106 may be automatically cleared to zero when the AMT 106 is cleared. Such clearing may occur, for example, responsive to a write of '1' to the AMT clear bit of the TCR 951 or by a transaction commit instruction.

Similarly, all TSR 952 status bits associated with the AUT 108 may be automatically cleared to zero when the AUT 108 is cleared. Such clearing may occur, for example, responsive to a write of '1' to the AUT clear bit of the TCR 951 or by a transaction commit instruction.

All the remaining bits of the TSR 951 (i.e., those not directly associated with the AMT 106 or AUT 108) may be automatically cleared to zero when both the AMT 106 and AUT 108 are cleared simultaneously or when either the AMT 106 or AUT 108 are cleared and the other structure is empty. The clearing can be done by a write to the AMT 106 clear bit and/or the AUT 108 clear bit of the TCR 951 or by a transaction commit instruction.

FIG. 7 illustrates that a user program 960 stored in a memory system 902 may include instructions that are useful in implementing any of several multithreading paradigms. Using such instructions, for example, a programmer may implement transactional execution, SPE, lock elision, and/or other multi-threaded programming paradigms.

FIG. 7 illustrates, via broken lines, that the use of any or all such instructions are optional. A thread unit 904 according to at least one embodiment of the present invention may decode and execute one or more of the instructions, or "primitives", described below in Table 1. Generally, the instructions may include one or more of the following: an instruction to write the transaction control register, an instruction to trigger the committing of buffered memory updates, an instruction to read the transaction status register, and/or an instruction to clear one of the transaction status register bits associated with trap/exception/interrupt handling. Of course, alternative embodiments may use more or fewer instructions than those shown in Table 1, in order to implement the functionality described.

TABLE 1

| Mnemonic | Operation |
| --- | --- |
| TRNXSET | Writes a value into the transaction control register based on a value in a source register. |
| TRNXCMT | Attempts to perform the buffered memory updates from the AUT to memory such that they appear to be performed atomically. |
| TRNXRD | Reads the current value of the Transaction Control Register and the Transaction Status Register |
| TRNXOK | Clears transaction trap bit |

The TRNXSET instruction writes, for at least one embodiment, values into the transaction control register (TCR) 951. Execution of the TRNXSET instruction may cause a transaction to start, or to fail. The instruction may also be used to temporarily disable monitoring of memory read (load) addresses.

The TRNXSET instruction can be used to demarcate the beginning of transactions by setting bits in the TCR 951 that will cause clearing the AMT 106 and AUT 108, and by setting bits in the TCR 951 that will cause updating and checking of the tables 106, 108 based on memory instructions in the atomic block. The value written into the TCR 951 as a result of execution of the TRNXSET instruction may be based on a value in a source register. A portion of the bits of the source register may be used as the value to be written into the TCR. Another portion of the bits of the source register may be used as a preserve mask (inverse of an update mask). Each bit with a value of zero in the preserve mask has the value in the TCR updated with the value from the update value, while each bit with a value of one in the preserve mask has the value in the TCR preserved as its previous value. The TRNXSET instruction can be executed at any privilege level (but it is assumed it will commonly only be used at CPL3 or in specific trap handlers that are transaction-aware).

The TRNXSET instruction can also be used to turn off address monitoring (turn off AMT updating) within a transaction, and later to turn back on monitoring, to allow specific memory addresses to be accessed without having the AMT monitor the address. This is important for implementing speculative multi-threading (multiscalar) execution so that the concept of the head token can be passed into a speculative block without leading to the block's failure.

The TRNXSET instruction can also be used to force the failure of a transaction by clearing the AMT and AUT and setting the TCR 951 to "disabled" and "no update".

For at least one embodiment, execution of the TRNXCMT instruction may cause the processor 904 to check the value of the transaction status register 952 (TSR). If the transaction fail bit is not set, then execution of the TRNXCMT instruction may cause the processor 904 to attempt to perform buffered memory updates from the AUT 108 to memory 902 such that they appear to be performed atomically.

Execution of the TRNXCMT instruction may cause the processor 904 to clear the AMT 106 and the AUT 108. Such execution may also clear the Transaction Control register TCR 951 to a value of all zeros. The TRNXCMT instruction may return in the source register a value to indicate if it successfully performed the buffered updates from the AUT 108. If the updates could not be performed, and the updates were instead discarded, then the processor 904 may update the source register with a value of zero. If the updates were performed, then the processor 904 may update the source register with a non-zero value. If the AUT 108 is empty, the commit may be considered successful, for at least one embodiment, and a non-zero value may be returned in the source register.

Execution of the TRNXRD instruction may cause the processor 904 to read the value of the transaction control register (TCR) 951 and the transaction status register (TSR) 952 into a destination register. For at least one embodiment, the value of the transaction control register 951 is shifted left by some fixed amount and ORed with the value of the transaction status register 951 to generate a value that is written into the destination register.

For at least one embodiment, execution of the TRNXOK instruction causes the processor 904 to write a value of zero to the Transaction Trap Bit (bit 5) of the Transaction Status Register. When the transaction trap bit is set, a trap handler may avoid forcing an error if a trap is taken during execution of an atomic block.

That is, a programmer may, by using the TRNXOK instruction and by setting certain bits in the TCR 951, explicitly control whether or not to update the AUT/AMT during trap handling. By default, the processor 904 may be designed such that taking a trap during turns off updates to the AMT 106 and AUT 108 tables. For such default operation, a trap taken during an atomic block terminates the transaction and causes a rest of the AMT 106 and AUT 108. When the trap returns, the transaction will have failed, causing the intermediate state to be discarded. However, such default operation may be overridden by the TRNXOK instruction, which allows a trap handler to avoid forcing a transaction failure when a trap is taken during execution of an atomic block and allows the state of the AMT 106 and AUT 108 to be persistent through the handling of a trap or exception that occurs during execution of the atomic block. For such embodiment, the transaction will not have failed when the trap returns, and execution of the atomic block may be resumed with the precise processor state that existed at the time the trap or exception occurred.

For at least one embodiment, the operation of the TRNXOK instruction allows a trap handler to perform work as part of the transaction. The AMT 106 and AUT 108 tables may be updated during trap handling, if so indicated by the current value of the TCR 951. Thus, for at least one embodiment, at least some classes of traps and exceptions may be serviced from within an atomic block.

At least one embodiment of a processor 904 may allow single-stepping through an atomic block. This allows running a single-step debugger from outside the atomic block, while maintaining the value of the AMT 106 and AUT 108. The effect is that a programmer may, according to at least one embodiment of the present invention, single-step through an atomic block and see the architected state at the end of each instruction. Such approach allows for traditional approaches for software debugging to be employed within an atomic block.

This feature is in contrast to other schemes where the intermediate state is undefined during execution of the instructions of an atomic block. For such schemes, the intermediate state is either committed or discarded before a trap may be serviced or single-stepping may be performed.

For at least one other embodiment, the TRNXOK instruction may allow a trap handler to perform work as part of the transaction, but the trap handler, from outside the atomic block, may read and write directly from/to memory, bypassing the AMT 106 and AUT 108 tables. Whether or not the AMT 106 and AUT 108 are to be bypassed may be indicated by the value of the TCR 951. Such approach allows the trap handler to execute while outside the atomic block.

In sum, the instructions enumerated in Table 1 may be implemented as a set of instruction set extensions that allows one to demarcate a block of instructions in a speculative thread as a transactional block and have hardware execute them such that updates are buffered and are either later discarded or are later performed atomically. The extensions may also provide that memory addresses read are monitored to detect foreign updates to detect memory dependencies. These extensions may thus allow software to attempt to execute speculative threads. This hardware provides support to allow efficient execution of speculative threads to enable a broad range of speculative threading models.

A processor, such as processor 904 shown in FIG. 7, which supports such instructions, is not necessarily required to provide any guarantee that speculative transactions will succeed successfully. Instead, hardware may fail a transaction as long as it correctly notifies software of the failure.

Figure 6:
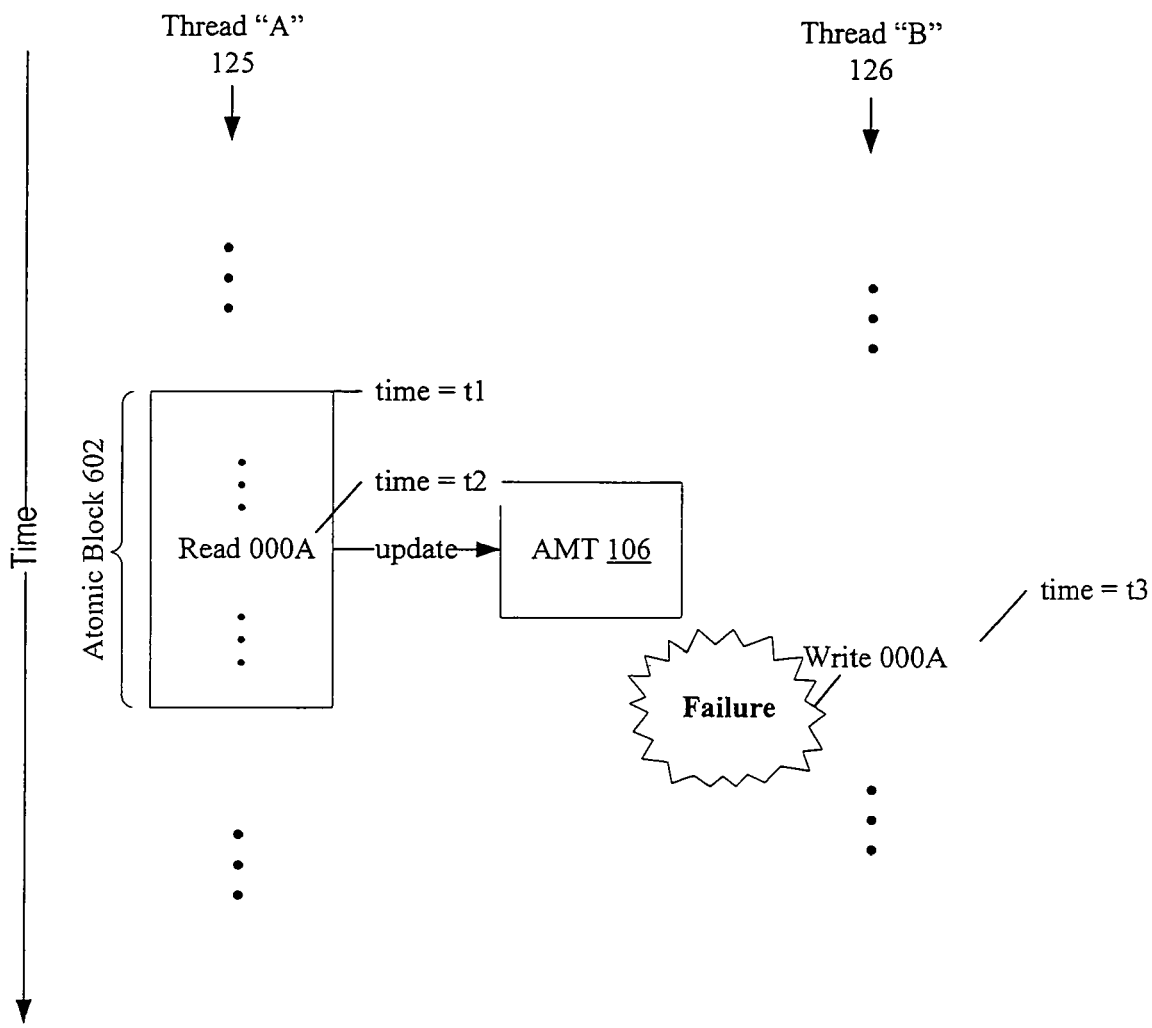
FIG. 6 is a data flow diagram illustrating at least one embodiment of a mechanism to determine that execution of a transactional block has failed.

FIG. 6 is a data flow diagram illustrating at least one embodiment of a mechanism to determine that execution of a transactional block has failed. FIG. 6 illustrates two cooperative threads, Thread A 125 and Thread B 126. Of course, one of skill in the art will recognize that the mechanism illustrated in FIG. 6 may be employed for any number (Y) of cooperative threads, where Y≧2.

FIG. 6 illustrates that a first time, time t1, the first cooperative thread 125 begins execution of an atomic block 602. During execution of the atomic block 602, at time t2, the first thread 125 executes a memory read instruction for a particular address. The address, illustrated in FIG. 6 as memory address "000A", is entered into the AMT 106 at the time the instruction is executed (t2).

FIG. 6 illustrates that, at time t3, a second thread, Thread B 126, executes a write to the memory address that was read by the first thread. The update by the second thread occurs after the first thread has read the memory address and before the first thread, Thread A 125, has completed execution. This attempt to write, by a second cooperative thread, to an address that has already been read by a first thread during execution of an atomic block, is noted by the hardware because it is recognized as a "foreign" write to one of the addresses in the AMT 106. Such event may trigger an asynchronous event to indicate that the execution of atomic block 602 has failed.

The data flow diagram illustrated in FIG. 6 shows just one instance of a failure during execution of an atomic block. Other events besides a foreign write to a previously-read memory address may cause execution of an atomic block to fail. One such event, for example, is a "table full" or overflow of the AMT 106 or AUT 108. Another such event, for example, is a read-after-write ("RAW") violation in the AUT 108. Other failure conditions may also be implemented, such as coherency collision, etc.

Various mechanisms may be utilized to inform software that execution of an atomic block has failed. For any of the events that may cause a failure of an atomic block, such events may be reported by the thread unit (such as, e.g., thread unit 104 of FIG. 2) as an asynchronous yield event, such as an interrupt. For at least one embodiment, the failure events may trigger a user-level interrupt.

One manner of implementing a user-level interrupt to indicate failure of transactional execution is referred to herein as user-level fly-weight interrupt handling. Such mechanism may include a channel in which certain triggering events may be indicated. The triggering event may be referred to as a "scenario." The triggering scenario may be an architecturally-defined set of one or more events. Alternatively, the triggering scenario may be a user-defined set of one or more events. Upon detection of the triggering scenario specified in the channel, control may be transferred to a user-level handler routine. Further description for at least one embodiment of such user-level fly-weight interrupt handling mechanism may be found in co-pending patent application Ser. No. _____, entitled "A Programmable Event Driven Yield Mechanism Which May Activate Service Threads".

For the processor embodiment 904 illustrated in FIG. 7, one or more scenarios may be defined to support one or more embodiments of the transactional execution scheme discussed herein. For at least one embodiment, a scenario (referred to as a "status-update scenario") may be defined such that an interrupt is generated when the contents of the TSR 952 change. That is, when the contents of the TSR 952 are updated in a particular manner, an interrupt may be generated.

The status-update scenario may be implemented by monitoring the transaction status register (TSR) with a mask. The status-update scenario thus may be associated with a mask that is applied to the TSR. If the ANDing of the mask and the TSR results in a non-zero value and the processor is in ring-level 3, then the scenario may trigger a user-level event handler. The mask may be defined such that an interrupt based on the status-update scenario may be generated when the TCR 952 indicates that a transaction has failed.

Accordingly, the discussion above indicates that a processor, such as processor 904 illustrated in FIG. 7, may fail a transaction as long as it correctly notifies software of the failure. That is, a programmer is not guaranteed, based on the hardware scheme discussed above, that an atomic block will successfully execute. For at least one embodiment, an additional capability is provided by the processor 904 so that a programmer may, when desired, employ one or more user-level software instructions to be assured that an atomic block will complete execution without contention from other cooperative threads. Such additional capability is referred to here in as "stop-the-world" capability.

Stop-the-world capability may be utilized to ensure atomic block execution even if the atomic block includes a large number of memory instructions (e.g., load and/or store instructions). Stop-the-world capability may also be utilized to ensure atomic block execution even if the atomic block always collides with other transactions. In general, stop-the-world may be utilized in software when that software has attempted to execute a speculative block of code using the instructions discussed above (see Table 1) and has determined that success is unlikely because of finite resource limits or because of repetitive memory dependency violations. The software may initiate a stop-the-world programming abstraction without using the speculative threading hardware Rather than relying on logical structures such as the AMT 106 and AUT 108, stop-the-world may be provided by a software layer (such as a library or runtime routine) that utilizes user-level interrupts to ensure atomicity by suspending all other cooperative threads during execution of an atomic block. Stop-the-world capability may utilize two interrupt scenarios that are supported by the processor 904.

The first scenario that may be utilized to implement stop-the-world is a foreign update scenario. That is, the scenario provides the ability to monitor a certain memory address for a foreign update, and to generate an interrupt if such update occurs. A "foreign" update may be understood to mean that the value at a memory address has been written by another cooperative thread. The foreign-update scenario may thus provide a mechanism for one thread to interrupt all other cooperative threads in order to synchronize on implementing the underlying programming model. This same scenario may also be used so that a speculative task can be informed when all earlier speculative tasks have completed and the speculative task can transition to become non-speculative.

The second scenario that may be utilized to implement stop-the-world is a return-scenario. The second scenario is to invoke a user-handler when control returns to user code from a trap/exception/interrupt handler. The scenario detects when a transition to ring-level 3 occurs and invokes a user-level handler. Such scenario basically allows for a user-level handler to be invoked whenever control returns to ring-level 3 from a trap/exception/interrupt handler. This scenario allows a thread to check if its cooperative threads are currently running software that this thread should be synchronized with. This could happen if the cooperative threads had synchronized while a thread was in a handler or was not actively scheduled.

Utilizing these two scenarios, a programmer may suspend all other cooperative threads so that a particular cooperative thread may execute an atomic block without contention from the suspended cooperative threads.

It will be noted that stop-the-world is an alternative manner of implementing transactional execution without the additional hardware structures 106, 108, state 951, 952 and instructions (see Table 1) discussed above (referred to herein as the "hardware" embodiment). Both approaches may be used together. It may be a very desirable programming model to let software program to the concept that there is a block of code that executes with the semantics that it is atomic. Stop-the-world may be used to preserve the programming semantics when transactional execution fails according to an embodiment of the hardware scheme described above.

The foreign update and return-from-handler scenarios discussed above can be used to implement stop-the-world behavior. To do so, the thread wishing to execute an atomic block may perform a swap to an agreed memory location used for synchronization. The swap may write a "busy" value to the memory location, and may check that the previous value was an "idle" value. If the previous value was not "idle," the thread may repeat until an "idle" value is detected.

All cooperative threads may have a scheme to monitor this synchronization location. For at least one embodiment, each cooperative thread may have a "foreign update" scenario active in a channel, so that an interrupt will be generated responsive to the conditions of the scenario being me. For at least one embodiment, if the "busy" value is written to the synchronization location, then the scenario has been satisfied, and a user-level interrupt is generated for all the other cooperative threads accordingly. (It should be noted that, for an alternative embodiment, similar functionality could be implemented via message passing through a memory interface, rather than via a user-level interrupt mechanism.) The associated event handlers for each of the cooperative threads may cause the cooperative threads to go into a spin lock, or other waiting mode, until the value at the synchronization location is set back to "idle" value.

All cooperative threads may also have a "return-to-ring-level 3" scenario active in a channel. The cooperative threads may thus be disrupted, and an interrupt handler invoked, when control returns to a user-privilege level from a trap/exception/interrupt handler. Upon satisfaction of the scenario, an interrupt may be generated. The associated interrupt handler may cause cooperative threads to check the synchronization location and spin-lock, or wait with other waiting mode, if it the value at the synchronization location is not "idle".

After waiting a bounded time, to allow time for all other cooperative threads to observe the synchronization event and stall execution, the thread that initiated the stop-the-world can then execute the atomic block. At the end of the atomic block, the thread may write the idle value to the synchronization location so that all cooperative threads can continue execution.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 7. System 900 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, set-top boxes and the like) may also be used. In one embodiment, sample system 900 may be executing a version of the WINDOWS® operating system available from Microsoft Corporation, although other operating systems and graphical user interfaces, for example, may also be used.

FIG. 7 illustrates that a processing system 900 capable of performing disclosed techniques may include a memory system 940 and a processor 904. Memory system 940 may include a memory 902 as well as one or more on- or off-chip caches. For example, memory system 940 may include a data cache 942 and/or an instruction cache 944.

Memory system 940 may store instructions 910 and/or data 912 for controlling the operation of the processor 904. The instructions 910 and/or data 912 may include code for performing any or all of the techniques discussed herein. Memory system 940 is intended as a generalized representation of memory and may include a variety of forms of memory, such as a hard drive, CD-ROM, random access memory (RAM), dynamic random access memory (DRAM), static random access memory (SRAM), etc, as well as related circuitry.

FIG. 7 illustrates that the processor 904 may include a front end 920. The front end 920 may include fetch and decode logic. For instance, the front end 920 may include logically independent next-instruction-pointer and fetch logic 320 to fetch instructions for each thread context, even though the multiple logical sequencers may be implemented in a single physical fetch/decode unit 322. The fetch/decode unit 322 may include decoder logic to decode instructions, such as the TRNXSET, TRNXCMT, TRNXRD and/or TRNXOK instructions described above. Responsive to receiving one of the instructions, the decode logic may send one or more signals to an execution core 930 that causes the execution core 930 to perform the desired operation. (Operations associated with at least one embodiment of each such instruction are set forth above in connection with the discussion of Table 1).

For an SMT embodiment of the multi-sequencer system 900 illustrated in FIG. 7, the term "sequencer" encompasses at least the next-instruction-pointer and fetch logic 320 for a thread context, along with at least some of the associated architecture state for that thread context. It should be noted that the sequencers of an SMT system 900 need not be symmetric. For example, two SMT sequencers for the same physical core 904 may differ in the amount of architectural state information that they each maintain.

Thus, for at least one embodiment, the multi-sequencer system 900 is a single-core processor 904 that supports concurrent multithreading. For such embodiment, each sequencer is a logical processor having its own instruction next-instruction-pointer and fetch logic 320 and its own architectural state information, although the same physical processor core 304 executes all thread instructions. For such embodiment, the logical processor maintains its own version of the architecture state, although execution resources of the single processor core may be shared among concurrently-executing threads.

At least one alternative embodiment of the system 900 illustrated in FIG. 7 be based on a multi-core processor (see, e.g., processor 200 illustrated in FIG. 2). Such a system may include two or more separate physical processors (see, e.g., 104-104n of FIG. 2) that is each capable of executing a different thread such that execution of at least portions of the different threads may be ongoing at the same time. Each processor includes a physically independent fetch unit 322 to fetch instruction information for its respective thread. In an embodiment where each processor executes a single thread, the fetch/decode unit 322 implements a single next-instruction-pointer and fetch logic 320. However, in an embodiment where each processor supports multiple thread contexts, the fetch/decode unit 322 implements distinct next-instruction-pointer and fetch logic 320 for each supported thread context.

The optional nature of additional next-instruction-pointer and fetch logic 320 in a processor 904 is denoted by dotted lines in FIG. 7.

While particular embodiments of the present invention have been shown and described, it will be obvious to those skilled in the art that changes and modifications can be made without departing from the scope of the appended claims. Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A method, comprising:
    buffering local memory writes during execution of an atomic block, wherein said buffering is performed responsive to a first user-level programming instruction;
    updating a trap field of a status register to a trap value in response to an interrupt during execution of the atomic block;
    maintaining the buffered local memory writes as persistent state during handling of the interrupt;
    updating a failure field of the status register, after handling the interrupt, to a failure value in response to the trap field of the status register not being cleared to a default value by a transaction safe handler during handling the interrupt; and
    resuming execution of the atomic block after handling the interrupt in response to the failure field of the status register not holding the failure value.

2. The method of claim 1, further comprising updating the failure field to the failure value in response to a non-trap failure condition, wherein: the non-trap failure condition includes a trigger scenario indicated by a user level programming instruction.

3. The method of claim 2, wherein said trigger scenario comprises a change in a value of one or more status bits of the status register, and wherein said one or more status bits are specified by a mask associated with the user-level programming instruction.

4. The method of claim 2, wherein: updating a failure field of the status register to a failure value in response to the trap field of the status register not being cleared to a default value after handling the interrupt and updating the failure field to the failure value in response to a non-trap failure condition comprises:
    updating a trap force failure bit of the status register to the failure value in response to the trap field of the status register not being cleared to the default value after handling the interrupt;
    updating a non-trap failure condition bit of the status register to the failure value in response to the non-trap failure condition; and
    updating the failure field of the status register to the failure value in response to either the trap force failure bit or the non-trap failure condition bit being updated to the failure value.

5. An apparatus, comprising:
    execution resources to execute an atomic block;
    a status register to hold a trap field, wherein the trap field is to be updated to a trap value in response to an interrupt occurring during execution of the atomic block, and wherein the trap field is adapted to be cleared by a transaction safe handler upon handling the interrupt;
    monitor hardware to monitor addresses loaded during execution of the atomic block;
    buffering hardware to buffer write operations during execution of the atomic block,
    wherein the monitor hardware and the buffering hardware are to maintain a persistent state during handling of the interrupt that occurs during execution of the atomic block, and wherein the execution resources are to resume execution of the atomic block without failing the transaction in response to the trap field of the status register being cleared after the handling of the interrupt.

6. The apparatus of claim 5, wherein transaction safe handler software, when executed by the execution resources to handle the interrupt, is to clear the trap field to not hold the trap value during handling of the interrupt.

7. The apparatus of claim 6, wherein the execution resources are to abort the atomic block after the handling of the interrupt in response to a failure field of the status register holding a failure value.

8. The apparatus of claim 7, wherein the trap field is the failure field, and wherein the failure value is the trap value.

9. The apparatus of claim 7, wherein the execution resources to abort the atomic block after the handling of the interrupt in response to the failure field of the status register holding the failure value comprises a force trap failure field of the status register to be updated to the failure value in response to the trap field holding the trap value after the handling of the interrupt and the failure field of the status register to be updated to the failure value in response to the force trap failure field of the status register being updated to the failure value.

10. The apparatus of claim 5, wherein the monitor hardware includes an Address Monitor Table (AMT) and the buffering hardware includes an Address Updated Table (AUT).

11. The apparatus of claim 5, wherein the trap field is capable of being cleared to not hold the trap value in response to the execution resources executing a clear trap bit instruction upon entry into a handler to handle the interrupt.

* * * * *